United States Patent
Kaijima et al.

(10) Patent No.: US 9,424,316 B2
(45) Date of Patent: Aug. 23, 2016

(54) CONTROLLING MIRRORING OF TABLES BASED ON ACCESS PREDICTION

(75) Inventors: Soh Kaijima, Nakanoshima (JP); Katsuyoshi Katori, Kanagawa (JP); Seiji Minami, Chiba (JP); Masakazu Sano, Chiba (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1109 days.

(21) Appl. No.: 13/312,194

(22) Filed: Dec. 6, 2011

(65) Prior Publication Data

US 2012/0166395 A1    Jun. 28, 2012

(30) Foreign Application Priority Data

Dec. 24, 2010    (JP) ................ 2010-288716

(51) Int. Cl.
*G06F 17/30* (2006.01)
*G06F 11/20* (2006.01)

(52) U.S. Cl.
CPC ... *G06F 17/30492* (2013.01); *G06F 17/30519* (2013.01); *G06F 17/30575* (2013.01); *G06F 11/2094* (2013.01); *G06F 2201/80* (2013.01)

(58) Field of Classification Search
CPC .............. G06F 17/30424; G06F 17/30575; G06F 17/30477; G06F 17/30442; G06F 17/30545; G06F 3/065; G06F 3/067; G06F 11/2082; G06F 17/30492; G06F 17/30519
See application file for complete search history.

(56) References Cited

U.S. PATENT DOCUMENTS

2002/0133507 A1* 9/2002 Holenstein et al. .......... 707/200
2005/0262317 A1* 11/2005 Nakanishi et al. ........... 711/162

FOREIGN PATENT DOCUMENTS

| JP | 06332625 A | 12/1994 |
|----|------------|---------|
| JP | 2003150419 A | 5/2003 |
| JP | 2005338893 A | 12/2005 |
| JP | 2006134321 A | 5/2006 |
| JP | 2007529059 | 10/2007 |
| JP | 2008097237 A | 4/2008 |
| JP | 2008158661 A | 7/2008 |
| JP | 2008525918 | 7/2008 |
| JP | 2010044789 A | 2/2010 |
| JP | 2010218219 | 9/2010 |

OTHER PUBLICATIONS

Norihiro Fujita et al. "Coarse-Grain Dynamic Replication Schemes for Scalable Content Delivery Networks" IEICE Technical Report, The Institute of Electronics, Information and Communication Engineers, IEEE, vol. 102, No. 129, pp. 2235-2239, 2002.

* cited by examiner

*Primary Examiner* — Cam-Y Truong
(74) *Attorney, Agent, or Firm* — Cantor Colburn LLP; David B. Woycechowsky

(57) ABSTRACT

A system for managing a plurality of storage devices that are configured to store a database. The system includes an access instruction acquiring unit configured for acquiring an access instruction to access the database. The system also includes a predicting unit configured for predicting a table to be accessed in response to the acquired access instruction. The system further includes a relocation unit configured for mirroring the table predicted by the predicting unit, the mirroring between the plurality of storage devices.

12 Claims, 11 Drawing Sheets

FIG. 9
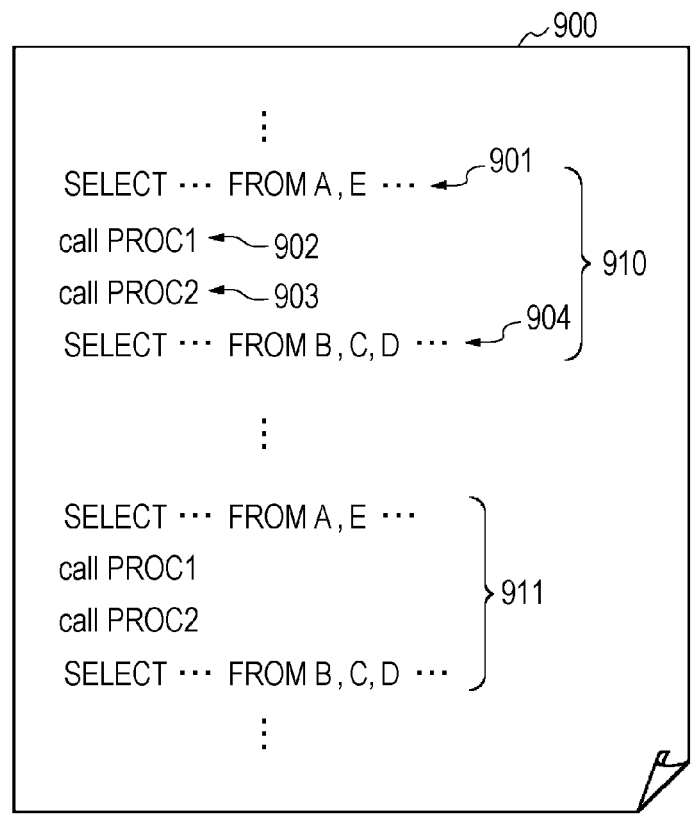
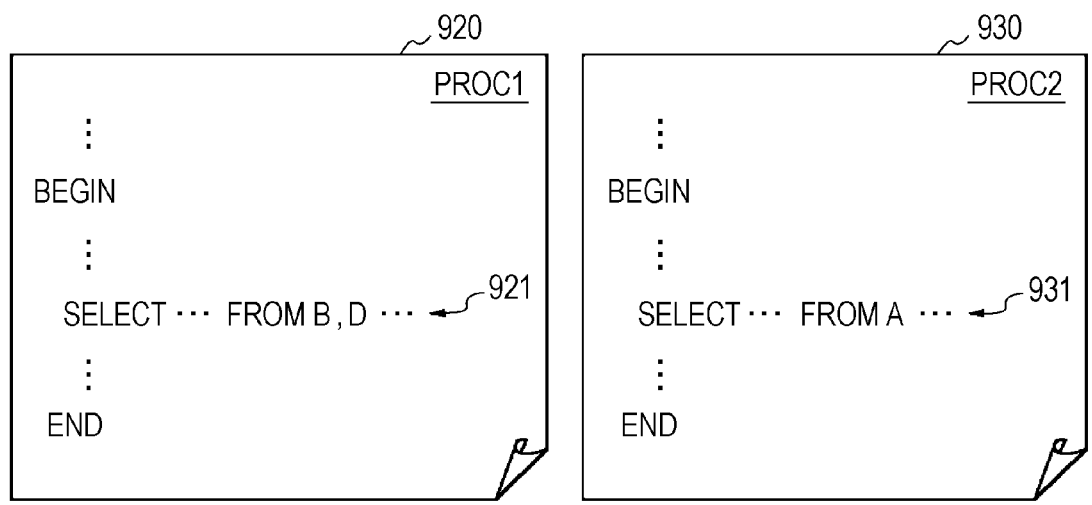

FIG. 10

| VOLUME | TABLE | | | | | AMOUNT OF ACCESS | MIRRORING |
|---|---|---|---|---|---|---|---|
| | A | B | C | D | E | | |
| 150a | 2 | 2 | | | | 4 | TO BE MIRRORED |
| 150b | | 2 | | | 1 | 3 | TO BE MIRRORED |
| 150c | | | 1 | | | 1 | NOT TO BE MIRRORED |
| 150d | | | | 2 | | 2 | TO BE MIRRORED |

# CONTROLLING MIRRORING OF TABLES BASED ON ACCESS PREDICTION

PRIORITY

This application claims priority to Japanese Patent Application No. 2010-288716, filed on 24 Dec. 2010, and all the benefits accruing therefrom under 35 U.S.C. §119, the contents of which are herein incorporated by reference in its entirety.

BACKGROUND

The present invention generally relates to database systems, and more specifically to controlling mirroring of tables in a relational database based on access prediction.

Japanese Patent Application Publication No. 2007-529059 describes a technique for automating a process of creating a remote mirror of a relational database that includes discovering the storage configuration and database layout of a primary database. This information is relayed to a backup storage subsystem. The database and storage systems are monitored for changes, and storage and/or database changes are conveyed to the backup storage subsystem. Japanese Patent Application Publication No. 2007-529059 also describes a self-configuring backup mirroring system for dynamic relational configuration that includes a source system monitoring one or more storage servers and a computer system executing a relational database management system (RDBMS).

Japanese Patent Application Publication No. 2008-525918 describes a technique for restoring data in a database mirroring environment where a user or administrator initiates a restore operation in a network that includes a first database located on a first client and a second database located on a second client. A dynamic mirror relationship that exists between the first and second clients is terminated and a backup version of a database which the user or administrator wishes to recreate is identified. One of the first or second clients receives information concerning the location of the backup version of the database. The backup version of the database is retrieved from the storage location and recreated on each of the first and second clients. The dynamic mirror relationship is then reestablished between the first and second clients.

SUMMARY

An embodiment is a system for managing a plurality of storage devices that are configured to store a database. The system includes an access instruction acquiring unit configured for acquiring an access instruction to access the database. The system also includes a predicting unit configured for predicting a table to be accessed in response to the acquired access instruction. The system further includes a relocation unit configured for mirroring the table predicted by the predicting unit between the plurality of storage devices.

Other embodiments include a computer program product and a method for managing a plurality of storage devices that are configured to store a database. An access instruction to access the database is acquired. A table to be accessed in response to the acquired access instruction is predicted, and the predicted table is mirrored between the plurality of storage devices.

BRIEF DESCRIPTION OF THE SEVERAL VIEWS OF THE DRAWINGS

The drawings referenced in the present application are only used to exemplify typical embodiments of the present invention and should not be considered to be limiting the scope of the present invention.

FIG. 9 is a diagram schematically illustrating an example of an access history in accordance with an embodiment;

FIG. 10 is a diagram illustrating an example of how volumes to be mirrored are selected in accordance with an embodiment.

DETAILED DESCRIPTION

Figure 1:
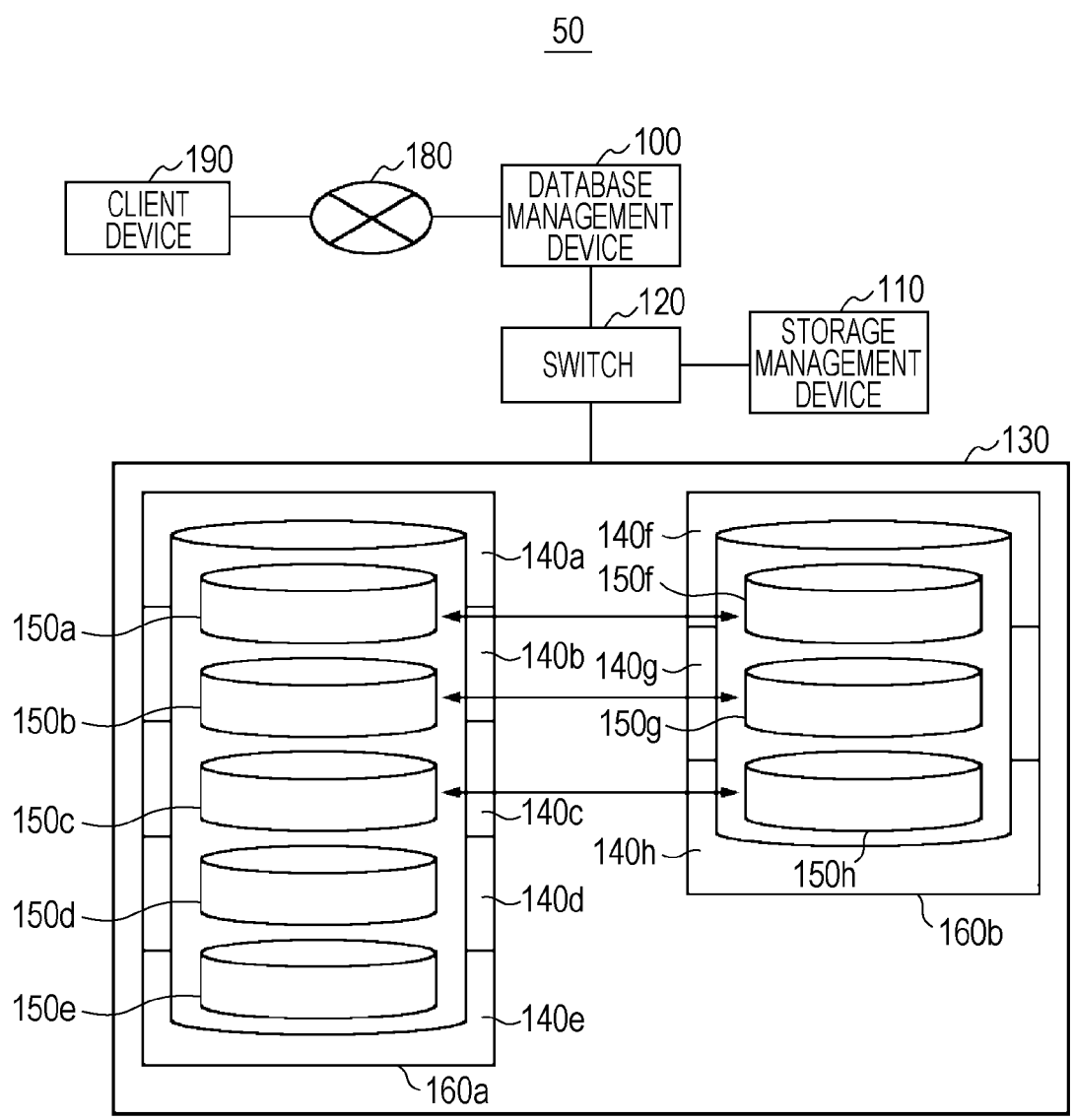
FIG. 1 is a diagram illustrating a configuration of a database system in accordance with an embodiment.

FIG. 1 illustrates a configuration of a database system 50 according to an embodiment of the present invention. In the database system 50 shown in FIG. 1, a database is created on large-capacity high-speed network storage configured by using, for example, a storage area network (SAN).

By introducing the SAN, a plurality of storage devices can be consolidated and new storage can be added in accordance with a consumption state of existing storage. However, the existing storage cannot be efficiently used by simply introducing the SAN. For example, when all existing data is moved to the new storage in order to take advantage of the high-speed performance of the new storage, the existing storage may not be efficiently used and may be wasted. When new data is stored in the new storage with existing data being left in the existing storage, the access performance for the existing data cannot be increased. Even if information lifecycle management (ILM) is performed and data is located in the new storage and the existing storage in a distributed fashion, it is not easy to appropriately define ILM policies in accordance with the frequency of use.

By using virtualization technologies in a SAN storage system, management of storage spaces provided by the SAN can be consolidated. For example, storage spaces created with the SAN are managed as a plurality of volumes and mirroring can be performed between the volumes. In this way, the availability of the storage system can be increased. Additionally, a desired volume can be mirrored by executing or cancelling mirroring of the volume online. However, mirroring cannot be efficiently performed unless the content of data located in the storage spaces created with the SAN is known. For example, a state in which a volume storing infrequently accessed data is mirrored is not a state in which mirroring is efficiently performed.

An embodiment of database system 50 provides a management system that addresses the aforementioned problems. The database system 50 includes a database management device 100, a switch 120, network storage 130, a network 180, and a client device 190. The database management device 100 receives a database request from the client device 190 via the network 180 and executes database processing corresponding to the received database request. For example, the client device 190 transmits, to the database management device 100, a database request including an access instruction to access the database. On the basis of the access instruction, the database management device 100 accesses data stored by the network storage 130.

The network storage 130 stores data belonging to a plurality of tables that constitute the database. The network storage 130 may be network storage created by using a SAN. For example, a plurality of storage devices 140*a* to 140*h* constitute a ring-shaped SAN using a fibre channel (or the like) and function as the network storage 130. The plurality of storage devices 140 are connected, via a switch 120, to the database management device 100 and to a storage management device 110 that manages the storage devices 140. That is, the plurality of storage devices 140 are connected via the SAN. The database management device 100 is also connected to the plurality of storage devices 140 via the SAN. The storage management device 110 manages storage spaces in an integrated fashion using the virtualization technologies in the network storage 130 created with the SAN.

The plurality of storage devices 140*a* to 140*h* may be, for example, magnetic recording devices such as hard disk drives (HDDs) or semiconductor storage devices such as flash solid state drives (SSDs). In an embodiment, it is assumed that the plurality of storage devices 140*a* to 140*h* are individual devices, such as drive devices. However, storage devices may include partitions or physical volumes instead of individual devices. In the description of the database system 50 according to an embodiment, the plurality of storage devices 140*a* to 140*h* are collectively referred to as the plurality of storage devices 140 or simply as the storage devices 140.

The storage management device 110 controls a plurality of volumes 150*a* to 150*h* provided by the respective storage devices 140. For example, the storage management device 110 reads data from and writes data to the plurality of volumes 150. The storage management device 110 also controls mirroring of the plurality of volumes 150*a* to 150*h*. An example of mirroring control will be described herein below. For example, the storage management device 110 issues a command or the like to the storage devices 140 to control the individual storage devices 140. The plurality of volumes 150*a* to 150*h* may be physical volumes or logical volumes. In the description of the database system 50 according to an embodiment, the plurality of volumes 150*a* to 150*h* are collectively referred to as the plurality of volumes 150 or simply as the volumes 150.

Data of each of a plurality of tables constituting the database may be stored in the plurality of volumes 150 in a distributed fashion. For example, one table is constituted by a plurality of container files and the plurality of container files may be located in the different volumes 150 in a distributed fashion. One volume 150 may store data belonging to one or more tables. For example, one volume 150 may store container files of different tables.

In the case that portions of data contained in a single table are stored in the volumes 150 of the different storage devices 140, writing or reading can be performed in parallel on the data of the single table. Additionally, as described herein below, in the case that a table is mirrored using the plurality of volumes 150 provided by the different storage devices 140, a read request can be issued to the plurality of storage devices 140 used in mirroring. Data returned from any one of the storage devices 140 can be adopted as data of the table. Since reading completes once the data is returned from one of the storage devices 140, the reading speed can be increased and, as a result, the input/output (I/O) speed can be increased.

The database management device 100 identifies an access-target table based on an access instruction from the client device 190 and preferentially mirrors the table. For example, the database management device 100 predicts an access-target table in advance based on an access instruction and selectively mirrors the volume 150 storing data of the table in advance. More specifically, the database management device 100 issues an instruction to selectively perform mirroring to the storage management device 110. In this way, it is possible to cancel mirroring of a volume 150 that will not be accessed and to start mirroring of a volume 150 to be accessed in advance. Thus, the reading speed can be increased while efficiently using the capacity of the network storage 130. The reading speed can be increased, particularly in processing such as batch processing in which many accesses continuously occur in a specific table.

As an example of usage of the database system 50, a case will be described in which new storage 160*a* is added to a database system which is originally operated using existing storage 160*b*, and the database system is now operated as the database system 50. The existing storage 160*b* provides the storage devices 140*f* to 140*h*. That is, the existing storage 160*b* provides the volumes 150*f* to 150*h*. The new storage 160*a* provides the storage devices 140*a* to 140*e*. That is, the new storage 160*a* provides the volumes 150*a* to 150*e*.

Operation of the database system 50 is started, for example, after all table data stored in the storage 160*b* is moved to the storage 160*a* having a larger capacity. At the start of operation of the database system 50, all tables can be mirrored using the volumes 150*f* to 150*h* provided by the storage 160*b*. If an amount of stored data increases as operation of the database is continued, all tables may be no longer mirrored.

However, as described above, the database management device 100 can cancel mirroring of a volume 150 not to be accessed and can start mirroring of a volume 150 to be accessed based on an access instruction. Accordingly, even if the amount of data becomes so large that all tables can be no longer mirrored, the database system 50 can switch between tables to be mirrored. Thus, the database system 50 can efficiently use the existing storage 160*b* and can keep operating while maintaining the read access speed.

Figure 2:
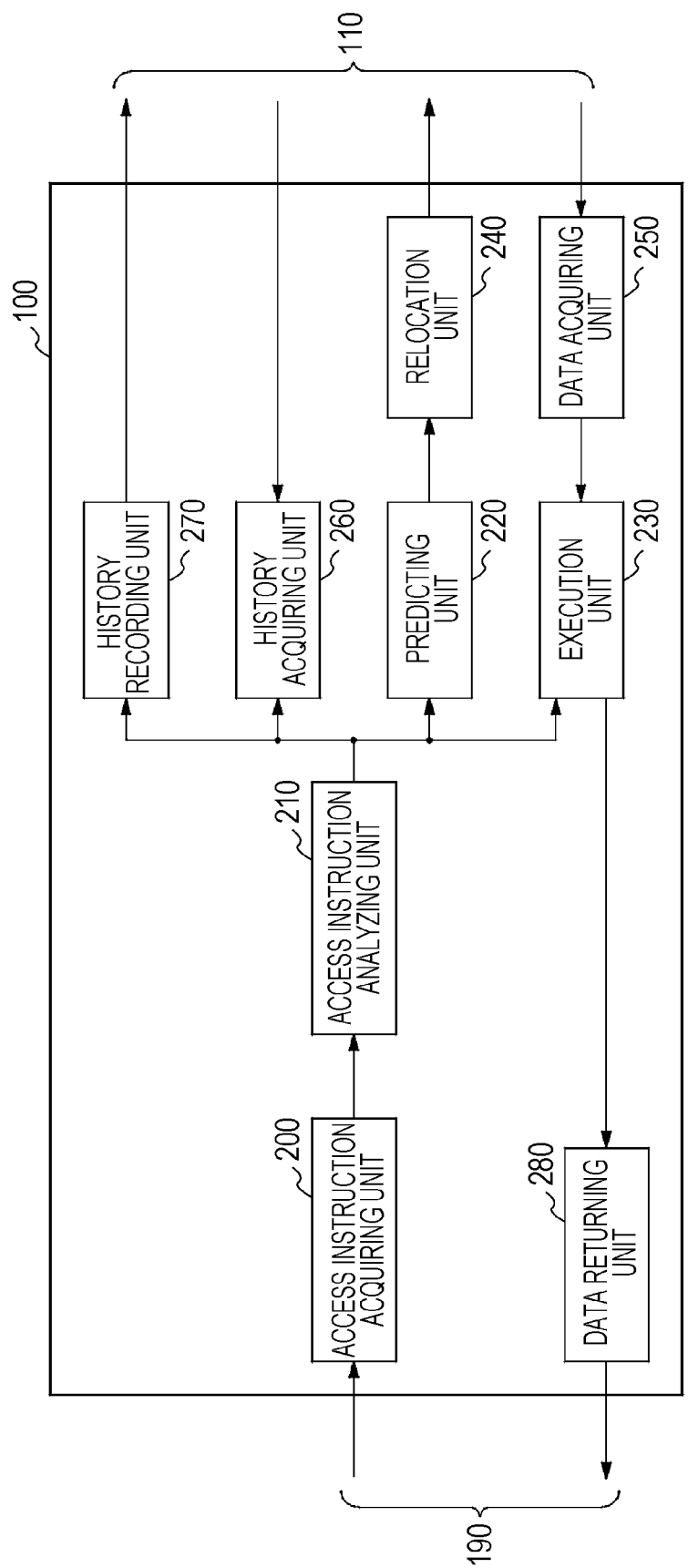
FIG. 2 is a diagram illustrating a block configuration of a database management device in accordance with an embodiment.

FIG. 2 illustrates a block configuration of the database management device 100 in accordance with an embodiment. The database management device 100 includes an access instruction acquiring unit 200, an access instruction analyzing unit 210, a predicting unit 220, an execution unit 230, a relocation unit 240, a data acquiring unit 250, a data returning unit 280, a history acquiring unit 260, and a history recording unit 270.

The access instruction acquiring unit 200 acquires an access instruction to access a database. For example, the access instruction acquiring unit 200 acquires an access instruction issued by the client device 190. The access instruction may be an instruction of a reference request or an update request written in the structured query language (SQL). Additionally, the access instruction may include an instruction for calling functions, such as a stored procedure including a series of procedures performed on a database.

The access instruction analyzing unit 210 analyzes the access instruction acquired by the access instruction acquiring unit 200. For example, the access instruction analyzing unit 210 compiles an SQL instruction written in SQL to determine an access path to a table. When the access instruction is static SQL and has been already pre-compiled, the access instruction analyzing unit 210 reads out an access path determined in pre-compiling.

The predicting unit 220 predicts a table to be accessed in response to the access instruction acquired by the access instruction acquiring unit 200. For example, the predicting unit 220 predicts which table is to be accessed based on the access path determined by the access instruction analyzing unit 210.

The relocation unit 240 mirrors the table predicted by the predicting unit 220 between the plurality of storage devices 140. For example, the relocation unit 240 mirrors the table predicted by the predicting unit 220 between the storage device 140f out of the plurality of storage devices 140 and the storage device 140a that has the access performance higher than the storage device 140f. More specifically, the relocation unit 240 identifies the volume 150 that stores the table predicted by the predicting unit 220 from the plurality of volumes 150 of the plurality of storage devices 140, and then mirrors the identified volume 150 between the plurality of storage devices 140. When container files of the table predicted by the predicting unit 220 are stored in the plurality of volumes 150 in a distributed fashion, the relocation unit 240 identifies the volumes 150 storing the container files of the access-target table from the plurality of volumes 150 assigned to the table predicted by the predicting unit 220, and mirrors the identified volumes 150. As described above, the relocation unit 240 identifies the volume 150 to be accessed in response to an access instruction from the plurality of volumes 150 assigned to the table predicted by the predicting unit 220, and mirrors the identified volume 150.

The execution unit 230 executes database processing based on the access instruction analyzed by the access instruction analyzing unit 210. More specifically, the data acquiring unit 250 issues a command to read an access-target container file to the storage management device 110, acquires data of the table, and supplies the execution unit 230 with the table data. The execution unit 230 processes the table data based on an SQL instruction or the like, thereby generating result data that is to be returned to the client device 190. The data returning unit 280 returns the result data to the client device 190.

The history recording unit 270 records an access history of a plurality of tables that have been accessed based on access instructions analyzed by the access instruction analyzing unit 210. More specifically, the history recording unit 270 transmits an execution log of the access instructions to the storage management device 110 to record the execution log in the network storage 130. The history acquiring unit 260 acquires the access history of a plurality of tables that have been accessed in processing of access instructions. More specifically, the history acquiring unit 260 reads out the access instruction execution log from the network storage 130 via the storage management device 110.

The predicting unit 220 predicts tables to be accessed based on the access history acquired by the history acquiring unit 260. For example, it may be determined based on the access history that a second table is accessed after access to a first table is started at a probability that is higher than a predetermined reference value. In such a case, the predicting unit 220 predicts that the second table is to be accessed after the first table is accessed. That is, the predicting unit 220 identifies the access order based on the access history acquired by the history acquiring unit 260. The relocation unit 240 mirrors the table identified by the predicting unit 220. As described above, the predicting unit 220 further identifies the access order that a plurality of tables are to be accessed in response to the acquired access instruction. The relocation unit 240 mirrors the plurality of tables in accordance with the access order identified by the predicting unit 220.

Figure 3:
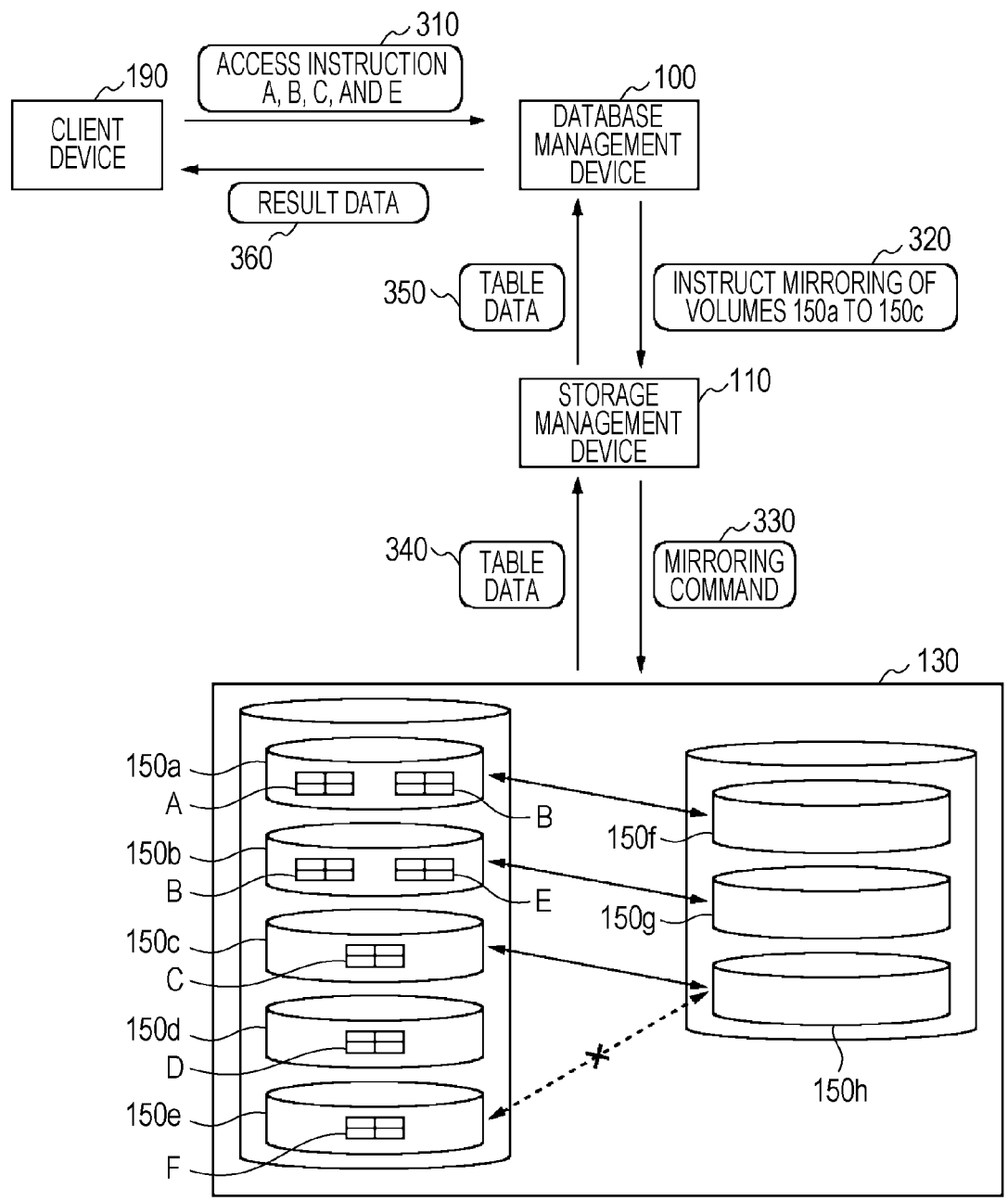
FIG. 3 is a diagram schematically illustrating a series of processes in a database system in accordance with an embodiment.

FIG. 3 schematically illustrates a series of processes in the database system 50 in accordance with an embodiment. As illustrated, the database management device 100 manages a database including a plurality of tables A to F.

A container file of the table A is stored in volume 150a. Container files of table B are stored in volumes 150a and 150b in a distributed fashion. A container file of table E is stored in volume 150b. Container files of tables C, D, and F are stored in volumes 150c, 150d, and 150e, respectively.

Now, it is assumed that the database management device 100 acquires an access instruction 310 from the client device 190 while table F is being mirrored between the volumes 150e and 150h. Here, it is assumed that the access instruction 310 is an SQL instruction including the names of tables A, B, C, and E. The access instruction analyzing unit 210 of the database management device 100 analyzes the access instruction 310 to determine an access path, thereby determining that tables A, B, C, and E are to be accessed. In accordance with the access path, the execution unit 230 causes the data acquiring unit 250 to access the container files of tables A, B, C, and E, thereby starting database processing.

In parallel to the database processing by the execution unit 230, the predicting unit 220 and the relocation unit 240 perform mirroring processing. More specifically, the predicting unit 220 determines the access order of tables A, B, C, and E on the basis of the access path. The relocation unit 240 identifies that the container files of tables A, B, C, and E are stored in volumes 150a to 150c on the basis of table management information, which includes location information of container files. For example, the relocation unit 240 refers to management information that stores paths to the container files in a file system, thereby being able to identify the volumes 150a to 150c. The relocation unit 240 then determines the order of mirroring volumes 150a to 150c on the basis of the access order of the tables.

The relocation unit 240 transmits, to the storage management device 110, mirroring instructions 320 to mirror volumes 150a to 150c in accordance with the determined order. Upon receiving the mirroring instructions 320, the storage management device 110 cancels the mirroring between the current volume 150h and volume 150e, and transmits a mirroring command 330 to mirror volumes 150a to 150c to a controller of the storage device 140 that provides each volume.

In response to the file access request issued from the data acquiring unit 250, the network storage 130 returns table data 340 including data stored in the tables. The table data 340 is transmitted, as table data 350, to the database management device 100 via the storage management device 110. The execution unit 230 processes the table data acquired by the data acquiring unit 250 in accordance with the SQL instruction or the like to generate data to be returned. The data to be returned is returned to the client device 190 as result data 360 from the data returning unit 280.

If the network storage 130 receives the file access request before mirroring of volumes 150a to 150c has been done, the table data read out from volumes 150a to 150c is returned. If the network storage 130 receives the file access request after mirroring has completed between volumes 150a to 150c and volumes 150f to 150h, respectively, table data read out from any of the volumes 150a to 150c and 150f to 150h is returned. Accordingly, the read access speed is increased after completion of the mirroring compared with the read access speed before completion of the mirroring.

Figure 4:
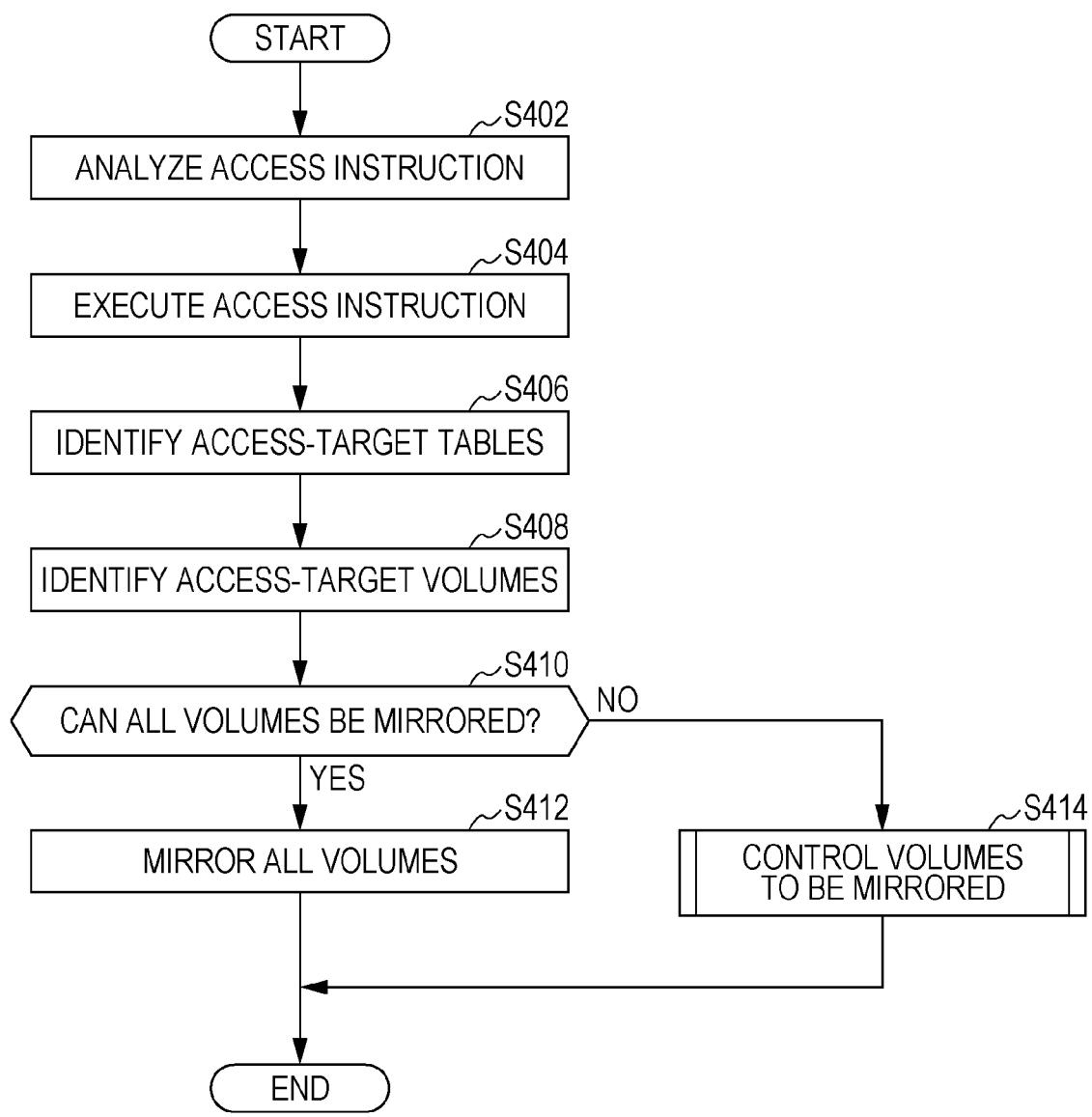
FIG. 4 is a diagram illustrating an operation flow of a database management device in accordance with an embodiment.

FIG. 4 illustrates an operation flow of the database management device 100 in accordance with an embodiment. This operation flow starts once the access instruction acquiring unit 200 newly acquires an access instruction. The access instruction analyzing unit 210 analyzes the access instruction to determine an access path (block S402). The execution unit 230 executes database processing for the access instruction in accordance with the access path (block S404).

In parallel to the processing by the execution unit 230, the following processing is executed. More specifically, the predicting unit 220 identifies tables set as access targets by the new access instruction (block S406). The relocation unit 240 identifies the volumes 150 newly set as access targets by the new access instruction (block S408). As the volumes 150 newly set as the access targets, the relocation unit 240 identifies the volumes 150 that store the tables to be newly mirrored but that are other than the currently mirrored volume 150.

The relocation unit 240 determines whether or not all of the volumes 150 newly set as the access targets can be mirrored (block S410). For example, the relocation unit 240 determines whether or not the number of volumes newly set as the access targets is less than or equal to the number of available volumes that are not currently being mirrored.

If it is determined in block S410 that all of the volumes 150 newly set as the access targets can be mirrored (block S410: YES), all of the volumes 150 newly set as the access targets are mirrored (block S412). The operation flow then ends. If the volume 150 to be newly mirrored exists, the relocation unit 240 transmits a mirroring command to mirror the volume 150 in block S412. If the volume 150 to be accessed for the new access instruction has already been mirrored, the volume 150 newly set as the access target does not exist. In such a case, the relocation unit 240 may terminate the operation flow without transmitting a mirroring command.

On the other hand, if it is determined in block S410 that all of the volumes 150 newly set as the access targets cannot be mirrored (block S410: NO), the relocation unit 240 controls the volumes 150 to be mirrored (block S414). Processing in block S414 will be described later. After completion of the processing in block S414, the operation flow ends.

Figure 5:
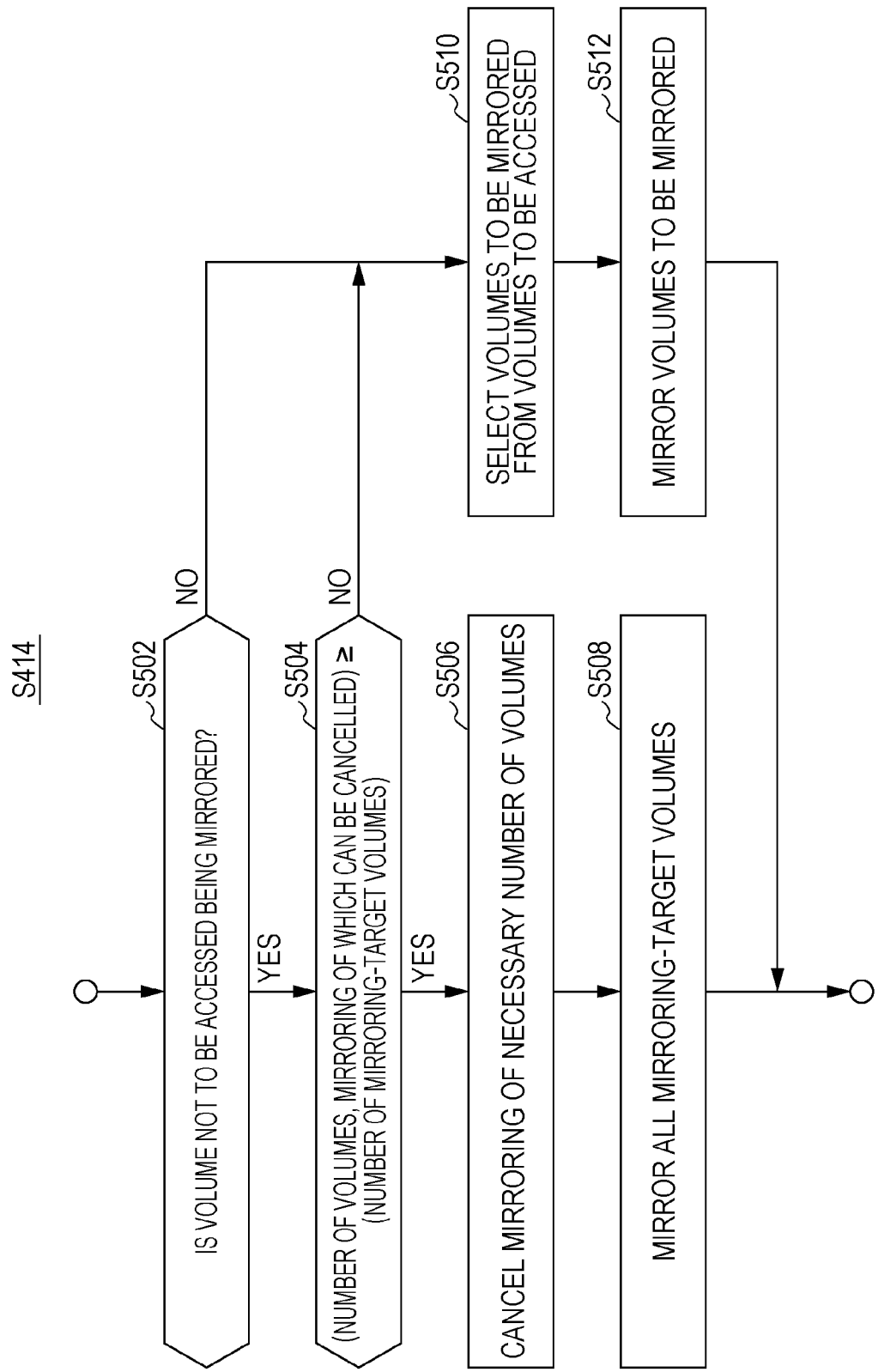
FIG. 5 is a diagram illustrating details of processing block S414 in FIG. 4 in accordance with an embodiment.

FIG. 5 illustrates details of the processing in block S414 in accordance with an embodiment. The relocation unit 240 determines whether or not the volumes 150 that are not to be accessed at this point exist among the volumes 150 that are currently being mirrored (block S502). More specifically, the relocation unit 240 determines whether or not the volumes 150, other than the volumes 150 that are set as the access targets by the previously acquired access instruction access processing of which has not completed and by the new access instruction, exist among the volumes 150 that are currently being mirrored.

If it is determined in block S502 that the volume not to be accessed is being mirrored (block S502: YES), the relocation unit 240 determines whether or not the number of volumes that do not need to be mirrored (i.e., mirroring of these volumes can be cancelled) is more than or equal to the number of volumes newly set as the mirroring targets (block S504). The number of volumes 150 mirroring of which can be cancelled refers to the number of volumes 150 that are currently being mirrored but that are not to be accessed at this point.

If it is determined in block S504 that the number of volumes 150 currently being mirrored which can be cancelled is more than or equal to the number of volumes newly set as the mirroring targets (block S504: YES), the relocation unit 240 selects the same number of volumes 150 currently being mirrored that can be cancelled as the number of the volumes newly set as the access targets, and cancels the mirroring (block S506) of those volumes that do not require mirroring. The number of the volumes where mirroring can be cancelled is not limited to the number of volumes newly set as the access targets. In block S506, the volumes 150 that are as many as or more than the number of volumes newly set as the access targets may be selected from the volumes 150 mirroring of which can be cancelled and the mirroring may be cancelled.

The relocation unit 240 then mirrors all of the volumes 150 newly set as the mirroring targets (block S508) and terminates the flow. As described above, the relocation unit 240 mirrors the volume 150 newly set as the mirroring target by cancelling mirroring of the volumes 150 not to be accessed.

On the other hand, if it is determined in block S502 that the volume not to be accessed is not being mirrored (block S502: NO) or if it is determined in block S504 that the number of volumes 150 currently being mirrored that can be cancelled is less than the number of volumes newly set as the mirroring targets, the relocation unit 240 selects at least one of volumes 150 to be mirrored from the volumes 150 to be accessed (block S510). Here, the volumes 150 to be accessed refer to the volumes 150 that are set as the access targets by the previously acquired access instruction access processing of which has not completed and by the new access instruction. In block S510, the relocation unit 240 selects the volume 150 to be mirrored from the volumes 150 to be accessed in accordance with the descending order of an expected access amount, for example.

The relocation unit 240 mirrors the volume 150 selected in block S510 (block S512). More specifically, if volumes 150 currently being mirrored that can be cancelled exist, the relocation unit 240 controls mirroring so that ongoing mirroring of the volumes 150 is cancelled and the volumes 150 selected in block S510 are mirrored. In block S512, the relocation unit 240 may cancel mirroring of the volume 150 that is to be accessed but mirroring of which has already completed. For example, when the relocation unit 240 determines that an access amount of the volume 150 newly set as the access target is larger than an access amount of the volume 150 that has been already mirrored, mirroring of the volume 150 that has been already mirrored may be cancelled. That is, when the amount of access regarding tables to be accessed in response to the newly acquired access instruction is larger than the amount of access regarding other tables that have been mirrored between the plurality of storage devices 140, the relocation unit 240 may mirror the tables to be accessed in response to the newly acquired access instruction preferentially to the other tables. After completion of the processing in block S512, this flow ends.

Figure 6:
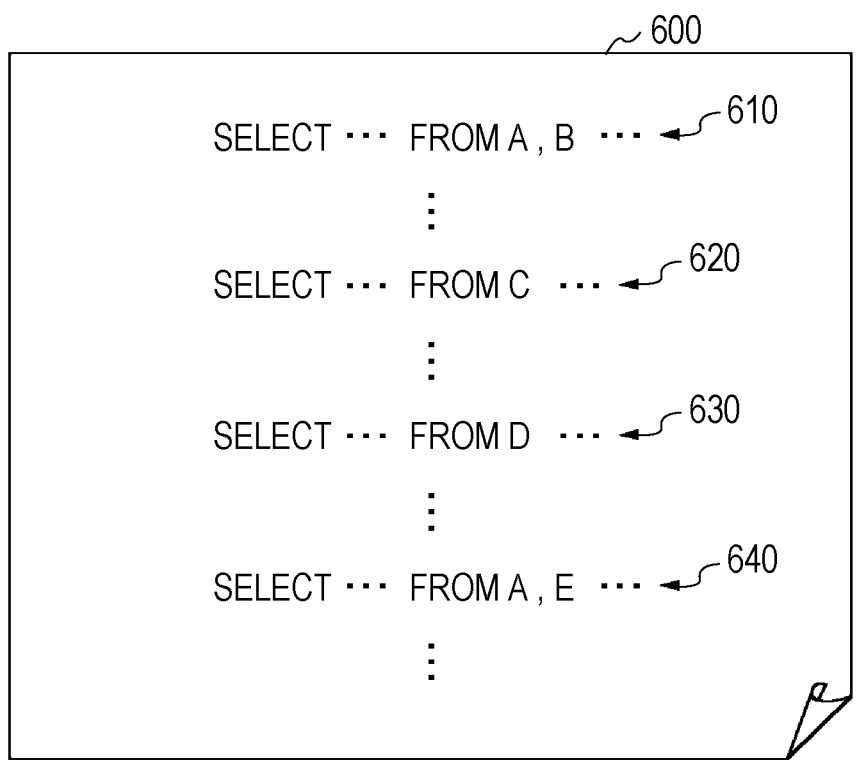
FIG. 6 is a diagram illustrating an example of sequentially executed access instructions in accordance with an embodiment.

FIG. 6 illustrates an example of sequentially executed access instructions in accordance with an embodiment. In this example, it is assumed that a stored procedure 600 is called as an access instruction. The stored procedure 600 of this example sequentially includes, as SQL instructions involving reading of tables, SQL instructions 610, 620, 630, and 640.

On the basis of a pre-compiling result of the stored procedure 600, the predicting unit 220 can predict that read access to tables A and B, read access to table C, read access to table D, and read access to tables A and E sequentially occur. The relocation unit 240 schedules mirroring of the volumes 150 on the basis of the order predicted by the predicting unit 220.

Figure 7:
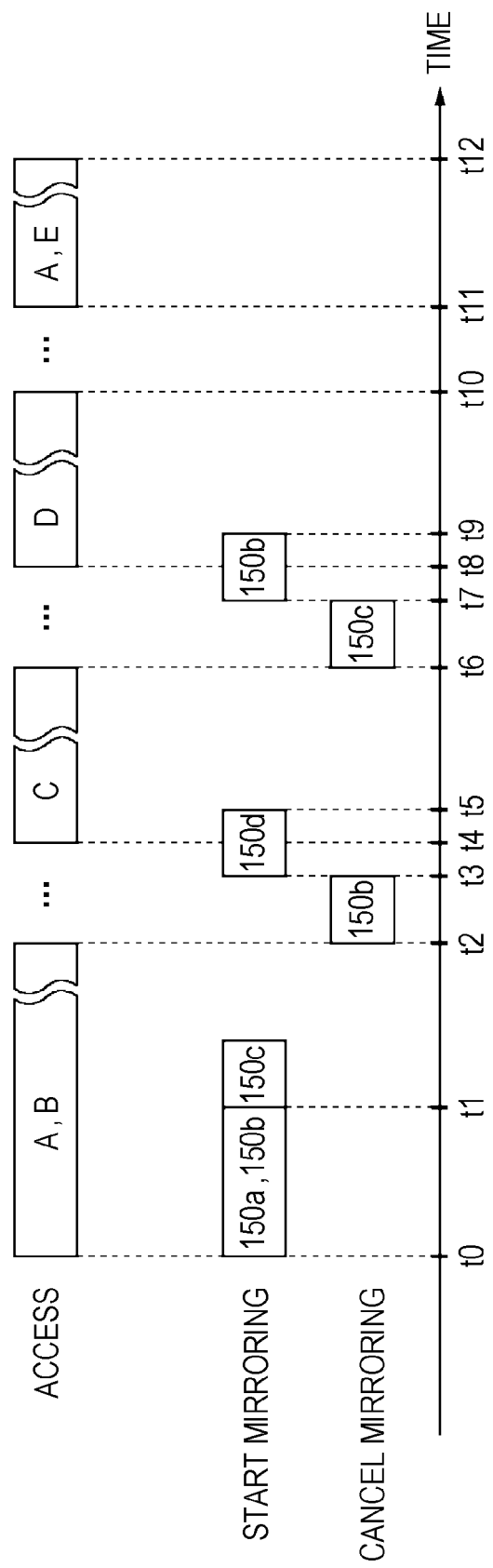
FIG. 7 is a diagram illustrating an example of a scheduling result of mirroring in accordance with an embodiment.

FIG. 7 illustrates an example of a scheduling result of mirroring of the volumes 150 in accordance with an embodiment. This figure illustrates an example of scheduling based on the stored procedure 600 of FIG. 6. By calling the stored procedure 600, read access to tables A to E occurs. Accordingly, read access to four volumes 150a to 150d occurs but it is assumed here that three volumes 150 can be mirrored at the same time. Additionally, it is assumed that execution of each of the SQL instructions 620, 630, and 640 starts after execution of the preceding SQL instruction ends in the stored procedure 600.

Since the access to table C starts after the access to tables A and B ends, the relocation unit 240 starts mirroring of tables A and B prior to the mirroring of table C. The relocation unit 240 schedules mirroring so that mirroring of table C is performed after mirroring of tables A and B. More specifically, the relocation unit 240 transmits, to the storage management device 110, mirroring instructions to mirror the volumes 150a and 150b. After mirroring of the volumes 150a and 150b completes, the relocation unit 240 transmits, to the storage management device 110, a mirroring instruction to mirror the volume 150c. Accordingly, mirroring starts at time t0. After mirroring of the volumes 150a and 150b completes at time t1, mirroring of the volume 150c starts at time t1.

Since the access to tables A and B occurs while waiting for completion of mirroring, table data is read out from the volumes 150a and 150b until the mirroring completes. After time t1, reading can be performed from the plurality of mirrored volumes 150. Thus, as described above, the read access speed increases. After the read access to tables A and B completes at time t2, the read access to table C starts at time t4. As illustrated, since the mirroring processing of the volume 150c has already completed at the start of the read access to table C, the speed of the read access to table C is initially increased.

After the read access to tables A and B completes, the relocation unit 240 cancels the mirroring of volume 150b. Although the volume 150b stores table E to be accessed later, the read access to table D starts before the read access to table E. Accordingly, the relocation unit 240 schedules mirroring so that mirroring of the volume 150b is temporarily cancelled and mirroring of the volume 150d starts. For example, the data acquiring unit 250 transmits, to the storage management device 110, a command to cancel mirroring of the volume 150b after the access to tables A and B ends at time t2. The relocation unit 240 then starts mirroring of the volume 150d after the cancellation of the mirroring completes at time t3. Mirroring of the volume 150d completes at time t5. Since the mirroring processing of the volume 150d has already completed at the start of the read access to the table D at time t8, the speed of the read access to table D is initially increased.

After the read access to table C completes at time t6, the relocation unit 240 cancels mirroring of the volume 150c that is no longer to be accessed. For example, the data acquiring unit 250 transmits, to the storage management device 110, a command to cancel mirroring of the volume 150c after the access to table C terminates at time t6. The relocation unit 240 then starts mirroring of the volume 150b storing table E to be accessed later after the cancellation of the mirroring completes at time t7. The mirroring of the volume 150b completes at time t9. The mirroring processing of the volume 150b has already completed and the volume 150a has been already mirrored at the start of the read access to tables A and E at time t11. Thus, the speed of the read access to tables A and E is initially increased.

In the example of this figure, the mirroring of the volume 150d is not cancelled after the read access to table D completes at time t10. However, the mirroring of the volume 150d may be cancelled after the read access to table D completes. Additionally, the mirroring of the volume 150b is temporarily cancelled after the read access to tables A and B completes. However, the mirroring of the volume 150a may be temporarily cancelled.

As illustrated in the embodiments shown in FIGS. 6 and 7 above, in accordance with the access order identified by the predicting unit 220, the relocation unit 240 cancels mirroring of an access-completed table out of a plurality of tables, and newly mirrors another table, access to which is to newly start. As illustrated, even when all access-predicted volumes 150 cannot be mirrored, the relocation unit 240 schedules mirroring including cancellation of mirroring, whereby it is possible to increase the utilization efficiency of the storage 160 and to realize the high-speed read access by scheduling mirroring.

Figure 8:
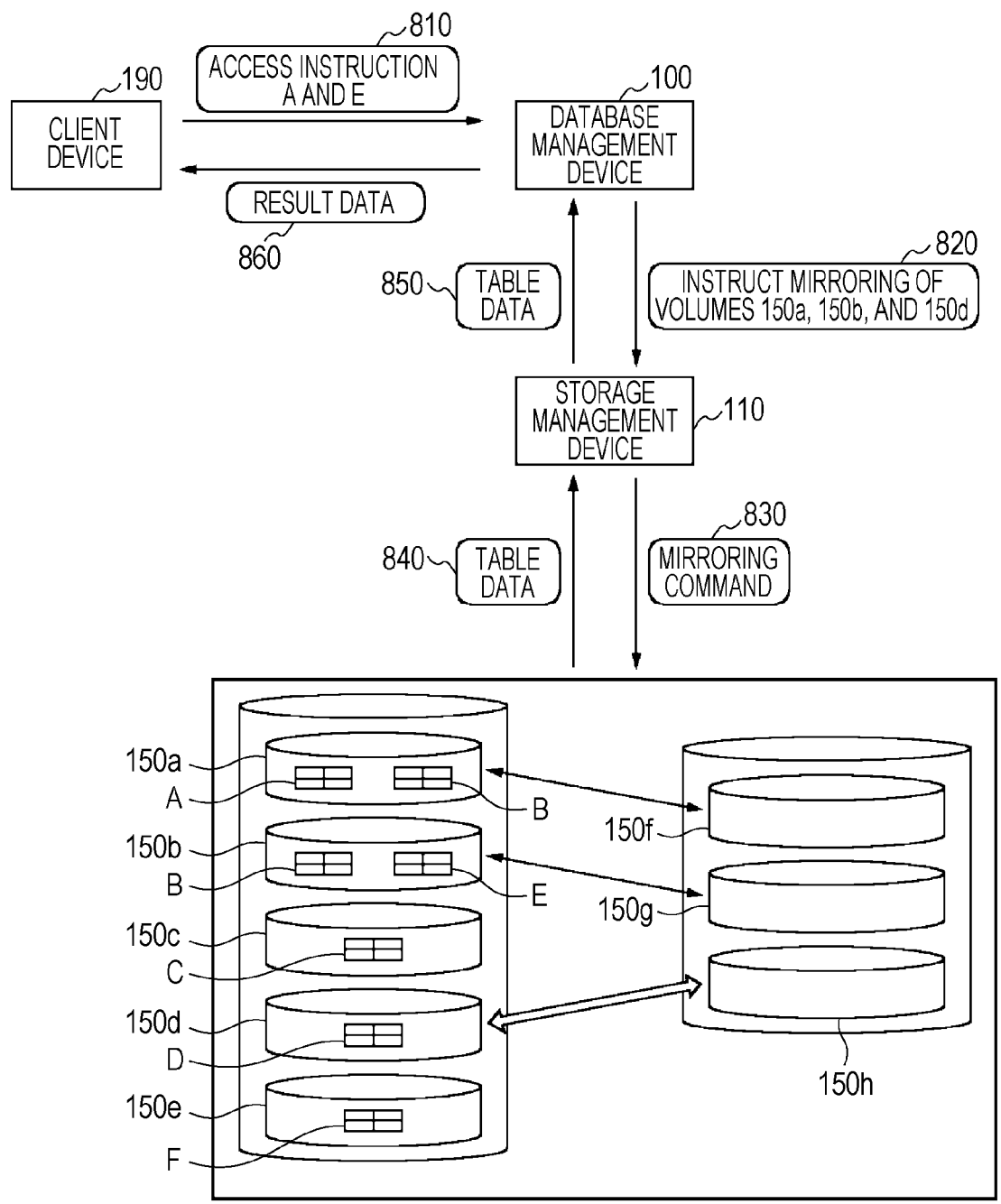
FIG. 8 is a diagram schematically illustrating a series of processes of predicting an access-target table in accordance with an embodiment.

FIG. 8 schematically illustrates a series of processes in the case that tables to be accessed in the future are predicted in advance in accordance with an embodiment. Suppose that the access instruction acquiring unit 200 acquires, from the client device 190, an access instruction 810 to access tables A and E. Suppose that, for example, the access instruction 810 is of the dynamic SQL including names of tables A and E.

As described above, when a processing logic of database access is written with the static SQL or the stored procedure, a series of tables to be accessed next can be identified in advance. However, when the processing logic is written with dynamic SQL, tables to be accessed next may dynamically change. Accordingly, when an instruction of dynamic SQL is acquired, the predicting unit 220 predicts tables possibly to be accessed in the future on the basis of a past access history.

More specifically, the predicting unit 220 groups tables that are highly possibly accessed in a series of accesses on the basis of the past access history acquired by the history acquiring unit 260. For example, when it is determined from the access history that the frequency that tables A, D, and E are successively accessed is high, the predicting unit 220 holds pieces of identification information of tables A, D, and E in association with each other. If tables A and E are accessed for the dynamic SQL, the predicting unit 220 predicts that table D stored in association with tables A and E is to be accessed in the future.

Processing in the example case where the access instruction acquiring unit 200 acquires the access instruction 810 will be described. The access instruction analyzing unit 210 compiles the access instruction 810 and determines that tables A and E are to be accessed. The execution unit 230 causes the data acquiring unit 250 to access container files of tables A and E to start database processing.

In parallel to the database processing by the execution unit 230, the predicting unit 220 and the relocation unit 240 perform mirroring processing. More specifically, as described above, the predicting unit 220 predicts that table D is to be accessed in the future on the basis of the past access history acquired by the history acquiring unit 260 and the tables accessed in response to the access instruction 810. The relocation unit 240 identifies that the container files of tables A, E, and D are stored in the volume 150a, 150b, and 150d, respectively, and determines that volumes 150a, 150b, and 150d are to be mirrored. Additionally, the relocation unit 240 determines the order of mirroring. For example, the relocation unit 240 determines that mirroring of the volume 150d corresponding to the access-predicted table D starts after mirroring the volumes 150a and 150b corresponding to tables A and E included in the access instruction 810.

The relocation unit 240 transmits, to the storage management device 110, mirroring instructions 820 to mirror the volumes 150a, 150b, and 150d in accordance with the determined order. The storage management device 110 generates and transmits mirroring commands 830 to the network storage 130 as in the process described for FIG. 3 and so forth. As in the process described for FIG. 3 and so forth, the network storage 130 returns table data 840 including data stored in the tables in response to a file access request issued from the data acquiring unit 250. The table data 840 is transmitted as table data 850 to the database management device 100 via the storage management device 110. The execution unit 230 processes the table data acquired by the data acquiring unit 250 in accordance with the SQL instruction or the like to generate data to be returned. The data to be returned is returned to the client device 190 from the data returning unit 280 as result data 860.

The database management device 100 can predict a table to be accessed on the basis of the access history and can mirror the table in advance. Accordingly, even if a process is constituted by a logic that does not set a read target in advance, such as the dynamic SQL, the volume 150 that is to be highly possibly accessed in the future can be appropriately mirrored.

FIG. 9 schematically illustrates an example of an access history in accordance with an embodiment. When an access instruction acquired by the access instruction acquiring unit 200 is dynamic SQL, the history recording unit 270 records the executed SQL instruction as an access log. For example, as indicated by SQL instructions 901 and 904 of this example, the SQL instructions that have been actually executed are recorded as the access log. In the case of an access instruction calling functions including static SQL, the history recording unit 270 records names of the called functions as the access log. For example, regarding call instructions 902 and 903, names of called stored procedures are recorded as the access log. The history acquiring unit 260 periodically accesses the access log to acquire an access history 900.

The predicting unit 220 identifies a combination of instructions that frequently appears as a series of processes on the basis of the access history 900. For example, as indicated by log portions 910 and 911 of this example, the predicting unit 220 extracts log portions including matching SQL instructions or matching called function names. The predicting unit 220 identifies a plurality of tables accessed in the extracted log portions and groups the plurality of identified tables. For example, the predicting unit 220 identifies access-target tables based on table names included in the SQL instructions 901 and 904.

Regarding a static SQL access instruction, such as the call instruction 902, the database management device 100 can identify tables to be accessed in pre-compiling and can record the tables in association with function names. For example, as indicated by a stored procedure 920 of this figure, identification information of tables B and D accessed with an SQL instruction 921 included in the stored procedure 920 is recorded in association with a function name "PROC1". Additionally, in an example of a stored procedure 930 of this figure, identification information of table A to be accessed with an SQL instruction 931 is stored in association with a function name "PROC2".

On the basis of the identification information stored in association with the function names, the predicting unit 220 can identify tables to be accessed by the call instructions 902 and 903. In the example of this figure, the predicting unit 220 stores identification information of tables A to E in association with each other on the basis of the SQL instructions and the call instructions in the log portion 910, thereby grouping tables A to E. As described for FIG. 8, if a dynamic SQL access instruction to access tables A and E is acquired, the predicting unit 220 predicts that tables B, C, and D whose identification information is associated with that of tables A and E are to be possibly accessed.

In the example illustrated by the log portion 910 of this figure, the table access order can be predicted. More specifically, the log portion 910 indicates that access to tables A and E, access to tables B and D, access to table A, and access to tables B to D occur. Accordingly, the predicting unit 220 may predict the order that the tables are accessed based on the access history. The relocation unit 240 can switch between the volumes 150 to be mirrored in accordance with the predicted order as described for FIG. 7 and so forth.

Additionally, in the example illustrated by the log portion 910 of this figure, the table access frequency can be predicted. For ease of explanation of the access frequency, it is assumed that the number of times a table appears in the SQL statement level is used as an index of the table access frequency. It can be predicted from the log portion 910 of this figure that the access frequency of each of the tables A, B, and D and the access frequency of each of the tables C and E are equal to 2 and 1, respectively. Accordingly, the predicting unit 220 can predict the table access frequency based on the access history. The relocation unit 240 predicts an access amount of the volume 150 based on the table access frequency. As described for block S510 of FIG. 5 and so forth, the relocation unit 240 selects the volume 150 to be mirrored based on the predicted access amount.

FIG. 10 is a diagram illustrating processing for selecting the mirroring-target volumes 150 in accordance with an embodiment. In this example, the description will be given using the log portion 910 described for FIG. 9.

The relocation unit 240 predicts an access amount of each of the volumes 150a to 150d from the access frequency of each of the tables A to E predicted by the predicting unit 220. For example, since the volume 150a stores container files of tables A and B, a sum of the access frequency of table A and the access frequency of table B is evaluated as the access amount of the volume 150a. Additionally, since the volume 150b stores container files of tables B and E, a sum of the access frequency of table B and the access frequency of table E is evaluated as the access amount of the volume 150b. Similarly, the access frequency of table C and the access frequency of table D are evaluated as the access amount of the volume 150c and the access amount of the volume 150d, respectively.

The relocation unit 240 selects the volumes 150 to be mirrored based on the access amounts. For example, the relocation unit 240 selects the volumes 150 to be mirrored in the descending order of the calculated access amounts. In the example of this figure, when three volumes 150 can be mirrored simultaneously, the relocation unit 240 selects the volumes 150a, 150b, and 150d as the volumes 150 to be mirrored.

Although the processing for selecting the volumes 150 to be mirrored has been described using the log portion 910 of FIG. 9 in this example, similar processing can be applied to the static SQL illustrated in FIG. 6. More specifically, the processing described in this figure can be applied to the processing in block S510 of FIG. 5. As described above, the predicting unit 220 determines access amounts of a plurality of tables to be accessed in response to an acquired access instruction. The relocation unit 240 preferentially mirrors a table that is determined to have a larger access amount.

In the description for FIGS. 3 to 10, it is considered that when a table stored in the plurality of volumes 150 in a distributed fashion is accessed, the plurality of volumes 150 may be accessed. For example, in the example of FIG. 10, the access amounts (or the number of accesses) of the volumes 150a and 150b are predicted based on the access amount (or the number of accesses) of table B. However, depending on content of the access instruction, some of the plurality of volumes 150 may not be accessed. For example, there is a case where one table is divided into a plurality of portions for each range of a value of a specific key (e.g., column) and the plurality of portions are located in different volumes 150 in a distributed fashion. In this case, if a retrieval condition is specified for the key using a "WHERE" phrase of an SQL instruction or the like, whether or not the volume 150 is to be accessed is determined depending on the retrieval condition. Accordingly, on the basis of the retrieval condition included in the access instruction, the relocation unit 240 can identify the volume 150 to be accessed in response to the access instruction out of the plurality of volumes assigned to the table. Thus, in block S510 of FIG. 5 and the example of FIG. 10, the relocation unit 240 can predict the access amount of each of the plurality of volumes 150 based on the retrieval condition included in the access instruction and on the access amount of the tables and can determine the volumes 150 to be mirrored based on the predicted access amounts.

As described above, the database management device 100 and the storage management device 110 operate in cooperation with each other in the database system 50, whereby the mirroring target can be dynamically controlled on the basis of the utilization prediction, which is based on content of the data stored in the plurality of volumes 150. Even if the read performance differs between the plurality of storages 160, an improvement in the read performance due to mirroring can be expected. Thus, the database system 50 is advantageous in terms of efficiently utilizing storage and increasing the reading speed of the storage.

Figure 11:
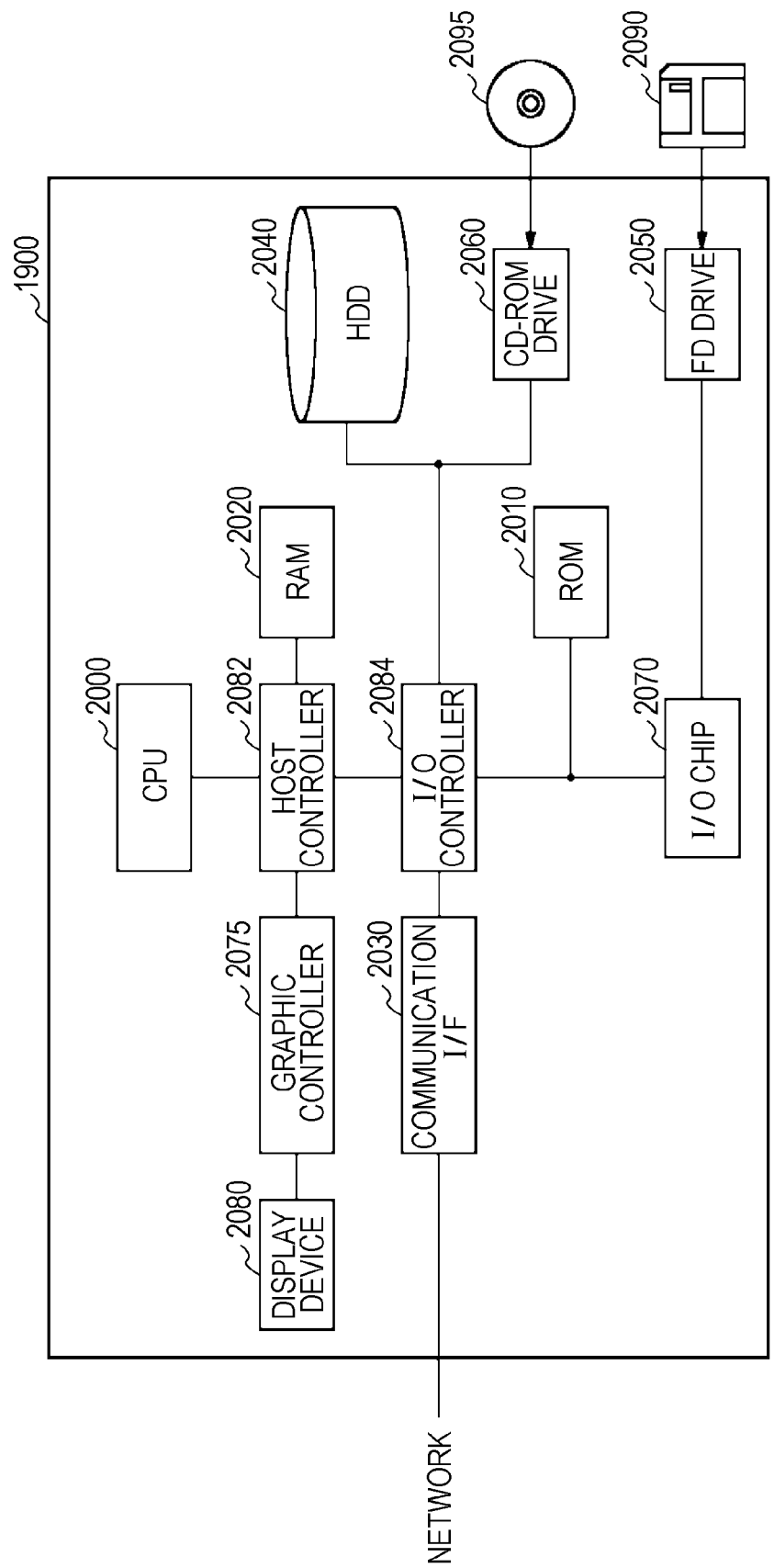
FIG. 11 illustrates an example of a hardware configuration of a computer in accordance with an embodiment.

FIG. 11 illustrates an example of a hardware configuration of a computer 1900 according to the embodiment. The computer 1900 according to the embodiment includes a central processing unit (CPU) peripheral section, an input/output (I/O) section, and a legacy I/O section. The CPU peripheral section includes a CPU 2000, a random access memory (RAM) 2020, a graphic controller 2075, and a display device 2080 that are connected to each other via a host controller 2082. The I/O section includes a communication interface (I/F) 2030, a hard disk drive (HDD) 2040, and a compact disc-read only memory (CD-ROM) drive 2060 that are connected to the host controller 2082 via an I/O controller 2084. The legacy I/O section includes a ROM 2010, a flexible disk (FD) drive 2050, and an I/O chip 2070 connected to the I/O controller 2084.

The host controller 2082 connects the RAM 2020 to the CPU 2000 and the graphic controller 2075 that accesses the RAM 2020 at high transfer rates. The CPU 2000 operates based on programs stored in the ROM 2010 and the RAM 2020 to perform control of each component. The graphic controller 2075 acquires image data generated by the CPU 2000 or the like in a frame buffer provided in the RAM 2020 and displays the image data on the display device 2080. Alternatively, the graphic controller 2075 may include a frame buffer that stores image data generated by the CPU 2000 or the like therein.

The I/O controller 2084 connects the host controller 2082 to the communication interface 2030, the hard disk drive 2040, and the CD-ROM drive 2060 that are relatively high-speed I/O devices. The communication interface 2030 communicates with another apparatus via a network. The hard disk drive 2040 stores programs and data used by the CPU 2000 in the computer 1900. The CD-ROM drive 2060 reads programs or data from a CD-ROM 2095 and supplies the program or the data to the hard disk drive 2040 via the RAM 2020.

The I/O controller 2084 is also connected to the ROM 2010, the flexible disk drive 2050, and the I/O chip 2070 that are relatively low-speed I/O devices. The ROM 2010 stores a boot program executed at the time of booting of the computer 1900 and/or programs depending on hardware of the computer 1900. The flexible disk drive 2050 reads programs or data from a flexible disk 2090 and supplies the programs or the data to the hard disk drive 2040 via the RAM 2020. The I/O chip 2070 connects the flexible disk drive 2050 to the I/O controller 2084 and also connects various I/O devices to the I/O controller 2084 via, for example, a parallel port, a serial port, a keyboard port, a mouse port, and so forth.

The programs supplied to the hard disk drive 2040 via the RAM 2020 are stored on a recording medium, such as the flexible disk 2090, the CD-ROM 2095, or an IC card, and are provided to a user. The programs are read out from the recording medium, are installed into the hard disk drive 2040 in the computer 1900 via the RAM 2020, and are executed in the CPU 2000.

A program that is installed into the computer 1900 and that causes the computer 1900 to function as the database management device 100 causes the computer 1900 to function as the access instruction acquiring unit 200, the access instruction analyzing unit 210, the predicting unit 220, the execution unit 230, the relocation unit 240, the data acquiring unit 250, the data returning unit 280, the history acquiring unit 260, and the history recording unit 270. Additionally, the program may be installed into the computer 1900 and may cause the computer 1900 to function as the storage management device 110. The program may also be installed into the computer 1900 and may cause the computer 1900 to function as the database management device 100 and the storage management device 110.

Information processing written in these programs is loaded to the computer 1900, thereby functioning as the access instruction acquiring unit 200, the access instruction analyzing unit 210, the predicting unit 220, the execution unit 230, the relocation unit 240, the data acquiring unit 250, the data returning unit 280, the history acquiring unit 260, and the history recording unit 270, which are concrete means resulting from cooperation of software and the aforementioned various hardware resources. Additionally, the information processing written in these programs is loaded to the computer 1900, thereby functioning as the storage management device 110, which is a concrete means resulting from cooperation of software and the aforementioned various hardware resources. These concrete means realize calculation or processing of information corresponding to the usage of the computer 1900 in this embodiment, whereby the characteristic database management device 100 and the characteristic storage management device 110 according to the usage are created.

For example, when the computer 1900 performs communication with an external apparatus or the like, the CPU 2000 executes a communication program loaded to the RAM 2020 and instructs the communication interface 2030 to perform communication processing on the basis of processing content written in the communication program. Under control of the CPU 2000, the communication interface 2030 reads out transmission data stored in a transmission buffer or the like provided in a storage device, such as the RAM 2020, the hard disk drive 2040, the flexible disk 2090, or the CD-ROM 2095, and transmits the transmission data to the network, or the communication interface 2030 writes reception data received from the network in a reception buffer or the like provided in the storage device. In this way, the communication interface 2030 may transfer transmission/reception data from and to the storage device using the direct memory access (DMA) method. Alternatively, the CPU 2000 reads data from a storage device or the communication interface 2030 of a transfer source, and writes the data in the communication interface 2030 or a storage device of a transfer destination, whereby transmission/reception data may be transferred.

Moreover, the CPU 2000 loads all or a necessary part of a file or a database stored in an external storage device, such as the hard disk drive 2040, the CD-ROM drive 2060 (the CD-ROM 2095), or the flexible disk drive 2050 (the flexible disk 2090), into the RAM 2020 using the DMA transfer or the like. Then, the CPU 2000 performs various types of processing on the data in the RAM 2020. Then, the CPU 2000 writes the processed data back to the external storage device using the DMA transfer or the like. In such processing, since the RAM 2020 can be considered to temporarily store the content of the external storage device, the RAM 2020, the external storage device, and the like are collectively referred to as a memory, a storage unit, or a storage device in the embodiment. Various types of information, such as various programs, data, tables, and a database in the embodiment are stored in such a storage device and subjected to information processing. The CPU 2000 may store a part of data of the RAM 2020 in a cache memory and perform read and write operations on the cache memory. Even in such an embodiment, since the cache memory undertakes some of the functions of the RAM 2020, it is assumed in the embodiment that the cache memory is included in the RAM 2020, a memory, and/or a storage device, unless otherwise noted.

Moreover, the CPU 2000 performs, on data read from the RAM 2020, various types of processing specified by an instruction sequence in a program. The various types of processing include various types of calculation, processing of information, condition determination, and retrieval and replacement of information described in the embodiment. Then, the CPU 2000 writes the processed data back to the RAM 2020. For example, when the CPU 2000 performs condition determination, the CPU 2000 compares each of the various types of variables shown in the embodiment with another variable or a constant and determines whether a condition is satisfied. The condition includes, for example, the variable is more than the other variable or the constant, the variable is less than the other variable or the constant, the variable is equal to or more than the other variable or the constant, the variable is equal to or less than the other variable or the constant, and the variable is equal to the other variable or the constant. When the condition is satisfied (or is not satisfied), the process branches to a different instruction sequence, or a subroutine is called.

The above-described programs or modules may be stored in an external recording medium. Other than the flexible disk 2090 and the CD-ROM 2095, for example, an optical recording medium such as a DVD or a CD, a magneto-optical recording medium such as an MO, a tape medium, or a semiconductor memory such as an IC card may be used as the recording medium. Moreover, a storage device, such as a hard disk or a RAM, provided in a server system connected to a private communication network or the Internet may be used as the recording medium, and the programs may be supplied to the computer 1900 via the network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for managing a plurality of storages, the plurality of storages comprising first storage and second storage, the plurality of storages configured to store a database, the system comprising:
   a processor;
   an access instruction acquiring unit configured to acquire
      an access instruction to access the database, the database comprising a first table, a second table, and a third table stored on the first storage, wherein the first storage comprises a plurality of volumes including a first volume storing at least a portion of the first table, a second volume storing at least a portion of the second table, and a third volume storing at least a portion of the third table;

a history acquiring unit configured to acquire an access history associated with the database;
a predicting unit configured to predict that the first table is to be accessed in response to the access instruction, wherein the predicting unit is further configured to identify an access order based at least in part on the access history, wherein identifying the access order comprises predicting that the third table is to be accessed after the first table, and wherein predicting that the third table is to be accessed after the first table comprises determining, based at least in part on the access history, that the third table is historically accessed after the first table at a probability that exceeds a predetermined value;
a relocation unit configured to generate and transmit mirroring instructions to mirror the first table from the first storage to the second storage;
a storage management device configured to
receive the mirroring instructions,
determine that mirroring the first volume and the second volume from the first storage to the second storage at least partially concurrently would cause a threshold number of the plurality of volumes permitted to be concurrently mirrored to be exceeded,
cancel mirroring of the second volume from the first storage to the second storage in response to the determining,
initiate mirroring of the first table by initiating mirroring of the first volume from the first storage to the second storage to cause, at least in part, a mirrored table that corresponds to the first table to be stored on the second storage, wherein the second storage is a higher performance storage than the first storage, and wherein the database in accessed in response to the access instruction by reading data from the mirrored table in the second storage; and
initiate mirroring of the third table by initiating mirroring of the third volume from the first storage to the second storage in accordance with the access order.

2. The system according to claim 1, the database further comprising a fourth table stored on the first storage, wherein the access instruction is a first access instruction,
wherein the access instruction acquiring unit is further configured to acquire a second access instruction to access the database,
wherein the predicting unit is further configured to identify the access order based at least in part on the first access instruction and the second access instruction, the access order indicating that the fourth table is to be accessed sequentially after the first table,
wherein the mirroring instructions indicate the access order, and
wherein the storage management device is configured to initiate mirroring of the fourth table from the first storage to the second storage sequentially after the mirroring of the first table based at least in part on the access order indicated by the mirroring instructions.

3. The system according to claim 1, the database further comprising a fourth table stored on the first storage,
wherein the predicting unit is further configured to determine, based at least in part on the access history, a first number of one or more accesses of the first table and a second number of one or more accesses of the fourth table,
wherein the relocation unit is further configured to determine that the first number of one or more accesses of the first table is greater than the second number of one or more accesses of the fourth table, and
wherein the storage management unit is further configured to initiate the mirroring of the first table prior to initiating mirroring of the fourth table from the first storage to the second storage based at least in part on determining that the first number of one or more accesses of the first table is greater than the second number of one or more accesses of the fourth table.

4. The system according to claim 1, wherein the access instruction is a first access instruction and the database further comprises a fourth table stored on the first storage,
wherein the access instruction acquiring unit is further configured to acquire a second access instruction to access the database,
wherein the predicting unit is further configured to predict that the fourth table is to be accessed in response to the second access instruction,
wherein a predicted number of accesses of the fourth table in response to the second access instruction is larger than a predicted number of accesses of the first table in response to the first access instruction, and
wherein the storage management device is further configured to initiate mirroring of the fourth table from the first storage to the second storage in response to the second access instruction preferentially to the mirroring of the first table.

5. The system according to claim 1, wherein the at least a portion of the first table is a first portion of the first table, wherein the relocation unit is further configured to identify a fourth volume storing a second portion of the first table from the plurality of volumes, and wherein the storage management device is further configured to initiate the mirroring of the first table by initiating mirroring of the fourth volume from the first storage to the second storage.

6. The system according to claim 1, wherein the first storage and the second storage are connected via a storage area network.

7. A computer implemented method for managing a plurality of storages that are configured to store a database, the plurality of storages comprising first storage and second storage, the method comprising:
acquiring an access instruction to access the database, the database comprising a first table, a second table, and a third table stored on the first storage, wherein the first storage comprises a plurality of volumes including a first volume storing at least a portion of the first table, a second volume storing at least a portion of the second table, and a third volume storing at least a portion of the third table;
acquiring an access history associated with the database;
predicting, by a computer processor, that the first table is be accessed, the predicting in response to the access instruction;
identifying an access order based at least in part on the access history, wherein identifying the access order comprises predicting, by the computer processor, that the third table is to be accessed after the first table, and wherein predicting that the third table is to be accessed after the first table comprises determining, based at least in part on the access history, that the third table is historically accessed after the first table at a probability that exceeds a predetermined value;
generating mirroring instructions to mirror the first table from the first storage to the second storage;
determining that mirroring the first volume and the second volume from the first storage to the second storage at least partially concurrently would cause a threshold number of the plurality of volumes permitted to be concurrently mirrored to be exceeded;

canceling, in response to the determining, mirroring of the second volume from the first storage to the second storage; and initiating, based at least in part on the mirroring instructions, mirroring of the first table by initiating mirroring of the first volume from the first storage to the second storage to cause, at least in part, a mirrored table that corresponds to the first table to be stored on the second storage, wherein the second storage is a higher performance storage device than the first storage, and wherein the database is accessed in response to the access instruction by reading data from the mirrored table in the second storage; and initiating mirroring of the third table by initiating mirroring of the third volume from the first storage to the second storage in accordance with the access order.

8. The method according to claim 7, the database further comprising a fourth table stored on the first storage, the method further comprising:

determining, based at least in part on the access history, a first number of one or more accesses of the first table and a second number of one or more accesses of the fourth table;

determining that the first number of one or more accesses of the first table is greater than the second number of one or more accesses of the fourth table; and initiating the mirroring of the first table prior to initiating mirroring of the fourth table from the first storage to the second storage based at least in part on determining that the first number of one or more accesses of the first table is greater than the second number of one or more accesses of the fourth table.

9. The method according to claim 7, further comprising executing the access instruction prior to completion of the mirroring of the first table, wherein executing the access instruction comprises reading data from the at least a portion of the first table stored in the first volume on the first storage.

10. The method according to claim 7, wherein canceling the mirroring of the second volume comprises canceling the mirroring of the second table.

11. A computer program product for managing a plurality of storages configured to store a database, the plurality of storages comprising first storage and second storage, the computer program product comprising:

a non-transitory computer readable storage medium having computer readable code embodied therewith, the computer readable code comprising computer readable program code configured for:

acquiring an access instruction to access the database, the database comprising a first table, a second table, and a third table stored on the first storage, wherein the first storage comprises a plurality of volumes including a first volume storing at least a portion of the first table, a second volume storing at least a portion of the second table, and a third volume storing at least a portion of the third table;

acquiring an access history associated with the database;

predicting that the first table is be accessed, the predicting in response to the access instruction;

identifying an access order based at least in part on the access history, wherein identifying the access order comprises predicting, by the computer processor, that the third table is to be accessed after the first table, and wherein predicting that the third table access history, that the third table is historically accessed after the first table at a probability that exceeds a predetermined value;

generating mirroring instructions to mirror the first table from the first storage to the second storage;

determining that mirroring the first volume and the second volume from the first storage to the second storage at least partially concurrently would cause a threshold number of the plurality of volumes permitted to be concurrently mirrored to be exceeded;

canceling, in response to the determining, mirroring of the second volume from the first storage to the second storage; and initiating, based at least in part on the mirroring instructions, mirroring of the first table from the first storage to the second storage to cause, at least in part, a mirrored table that corresponds to the first table to be stored on the second storage, wherein the second storage is a higher performance storage device than the first storage, and wherein the database is accessed in response to the access instruction by reading data from the mirrored table in the second storage; and initiating mirroring of the third table by initiating mirroring of the third volume from the first storage to the second storage in accordance with the access order.

12. The computer program product according to claim 11, the database further comprising a fourth table stored on the first storage, wherein the computer readable program code is further configured for:

determining, based at least in part on the access history, a first number of one or more accesses of the first table and a second number of one or more accesses of the fourth table;

determining that the first number of one or more accesses of the first table is greater than the second number of one or more accesses of the fourth table; and initiating the mirroring of the first table prior to initiating mirroring of the fourth table from the first storage to the second storage based at least in part on the determining that the first number of one or more accesses of the first table is greater than the second number of one or more accesses of the fourth table.

* * * * *